United States Patent
Ganesan et al.

(10) Patent No.: US 9,667,724 B2
(45) Date of Patent: May 30, 2017

(54) CLOUD OFF-RAMP MANAGEMENT

(71) Applicant: Hewlett-Packard Development Company, L.P., Houston, TX (US)

(72) Inventors: Kumaravel Ganesan, Chinnalapatti (IN); Rajesh Bhatia, Bangalore (IN); Diane R. Hammerstad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/764,905

(22) PCT Filed: Jan. 31, 2013

(86) PCT No.: PCT/US2013/024187
§ 371 (c)(1),
(2) Date: Jul. 30, 2015

(87) PCT Pub. No.: WO2014/120217
PCT Pub. Date: Aug. 7, 2014

(65) Prior Publication Data
US 2015/0373118 A1  Dec. 24, 2015

(51) Int. Cl.
*G06F 3/12* (2006.01)
*H04L 29/08* (2006.01)
*G06F 17/30* (2006.01)

(52) U.S. Cl.
CPC ........ *H04L 67/1097* (2013.01); *G06F 3/1203* (2013.01); *G06F 3/127* (2013.01); *G06F 3/1268* (2013.01); *G06F 3/1287* (2013.01); *G06F 3/1288* (2013.01); *G06F 17/3089* (2013.01); *G06F 3/1257* (2013.01); *G06F 3/1267* (2013.01)

(58) Field of Classification Search
USPC .................. 713/165; 358/1.15; 707/769, 224
See application file for complete search history.

(56) References Cited

U.S. PATENT DOCUMENTS

| | | | |
|---|---|---|---|
| 6,509,974 B1 | 1/2003 | Hansen |
| 7,580,139 B2 | 8/2009 | Oba |
| 7,580,943 B2 | 8/2009 | Sakura et al. |
| 7,676,512 B2 | 3/2010 | Yamamoto et al. |
| 7,810,040 B2 | 10/2010 | Mori et al. |
| 7,925,682 B2 | 4/2011 | Moore et al. |
| 8,019,792 B2 | 9/2011 | Morooka |
| 8,077,344 B2 | 12/2011 | Kurata |
| 8,335,762 B2 | 12/2012 | Gbadegesin et al. |
| 9,041,959 B2 | 5/2015 | Venkata Prasad Palipi Kandubai et al. |
| 2005/0237564 A1 | 10/2005 | Sugimoto |
| 2006/0026121 A1 | 2/2006 | Terao |

(Continued)

OTHER PUBLICATIONS

Automatically Print Files Placed in Folder, Dec. 1, 2009, <http://community.spiceworks.com/topic/83142-automatically-print-files-placed-in-folder >.

(Continued)

*Primary Examiner* — Jerome Grant, II
(74) *Attorney, Agent, or Firm* — Mannava Kang PC

(57) ABSTRACT

According to an example, cloud off-ramp management may include generating folders on a cloud storage system and retrieving content from the folders based on folder settings. Retrieved content may be sent over the Internet to a device associated with the content.

20 Claims, 5 Drawing Sheets

(56) References Cited

U.S. PATENT DOCUMENTS

| | | |
|---|---|---|
| 2006/0143185 A1 | 6/2006 | Kuroyanagi |
| 2010/0332818 A1 | 12/2010 | Prahlad et al. |
| 2011/0205586 A1 | 8/2011 | Takahashi et al. |
| 2011/0276622 A1 | 11/2011 | Knapp et al. |
| 2012/0221520 A1 | 8/2012 | Garrett et al. |
| 2012/0221668 A1 | 8/2012 | Chen et al. |
| 2013/0100477 A1* | 4/2013 | Ozaki .................. G06F 3/1204 358/1.13 |
| 2014/0115329 A1* | 4/2014 | Sturonas ............... H04L 9/0822 713/165 |
| 2014/0365655 A1* | 12/2014 | Takahashi ............... H04L 67/10 709/225 |
| 2014/0372514 A1* | 12/2014 | Doui ..................... G06F 3/1222 709/203 |
| 2015/0015908 A1* | 1/2015 | Tanaka ............... G06K 15/4095 358/1.14 |
| 2015/0268911 A1* | 9/2015 | Sato ..................... G06F 3/1292 358/1.14 |
| 2015/0312262 A1* | 10/2015 | Doshi .................. H04L 63/105 726/1 |
| 2015/0319185 A1* | 11/2015 | Kirti ................... H04L 63/1416 726/23 |
| 2015/0350468 A1* | 12/2015 | Kodimer ............ H04N 1/00413 358/1.13 |
| 2016/0027050 A1* | 1/2016 | Chong ............... G06Q 30/0275 705/14.53 |
| 2016/0078237 A1* | 3/2016 | Tan ........................ G06F 21/62 726/28 |

OTHER PUBLICATIONS

Egnyte, "Hybridoloud Access and Storage," (Web Page), 2013, 13 pages, found at http://www.egnyte.com/file-server/online-file-server-features.html. Dec. 2013.

Hewlett-Packard Development Company, L.P., "HP Digital Sending Software 4," Data sheet, Jun. 2012, <http://www8.hp.com/h20195/v2/GetPDF.aspx%2F4AA0-7272ENW.pdf>.

Hewlett-Packard Development Company, L.P. "HP Digital Sending Software V4," Software Technical Reference (Public), 2005, <http://h20566.wwww2.hp.com/hpsc/doc/public/display?docId=emr_na-c00433124-3&docLocale=>, Dec. 2005.

International Searching Authority, International Search Report and Written Opinion, Oct. 31, 2013, 9 pages.

Print Files From Anywhere via Any Device with Dropbox, Download Date: Feb. 1, 2013. <http://www.howtogeek.com/howto/33088/print-files-from-anywhere-via-any-device-with-dropbox/>.

Silentprint Batch Printing Software, download date: Feb. 1, 2013. <http://www.silentprint.com/>.

Webpage retrieved Sep. 21, 2015. Hotfolder Prints—Automatic formatting and printing of photos for even photographers. >http://www.breezesys.com/Hotfolder/index.htm<.

Webpage, How to use Apple Automator to send PDF files to a laser printer. Retrieved Sep. 21, 2015, http://www.proofmaster.net/support/faq/how-use-apple-automator-send-pdf-files-laser-printer.

* cited by examiner

CLOUD OFF-RAMP MANAGEMENT

BACKGROUND

Cloud storage systems are becoming very popular. Users typically upload their content, such as photographs, videos, and documents, to the cloud storage system. Then, they can generally access their content from any device and from any location with an Internet connection. Also, users can easily share their content by giving others users access to their content on the cloud.

BRIEF DESCRIPTION OF THE DRAWINGS

Embodiments are described in detail in the following description with reference to the following figures. The figures show examples of the embodiments and like reference numerals indicate similar elements in the accompanying figures.

FIG. 6 illustrates a computer system.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the description of the embodiments.

A cloud off-ramp management system identifies content in a cloud storage system, that is to be off-ramped and facilitates off-ramping the content for example, based on rules and settings. Off-ramping may include providing the content to a device whereby the content can be displayed or printed or otherwise used at the device. Content may be off-ramped to an end user device, such as a printer, smart phone, laptop, etc. The content may be off-ramped to a device with minimal user interaction. For example, the user may no longer have to log into their cloud storage system, search for desired content to print or display, download their content and send it to local printer or another device, which tends to be very time consuming. Also, the cloud off-ramp management system can configure multiple different cloud storage systems for off-ramping content to a device.

A cloud storage system comprises storage resources, for example including hardware and software, that are made available as a service over a network, typically the Internet. Different cloud storage systems are currently available from different cloud storage service providers. The cloud storage system services may be made available to users on a subscription basis or for free. A user may create an account in the cloud storage system and is allocated a certain amount of storage space for storing their content, and then the user can access their content as needed via the Internet. The cloud off-ramp management system facilitates printing or displaying from a cloud storage system as is further described below. In addition, the cloud off-ramp management system may concatenate content according to time-based rules or other rules and off-ramp the concatenated content to a selected device, as is further described below.

Figure 1:
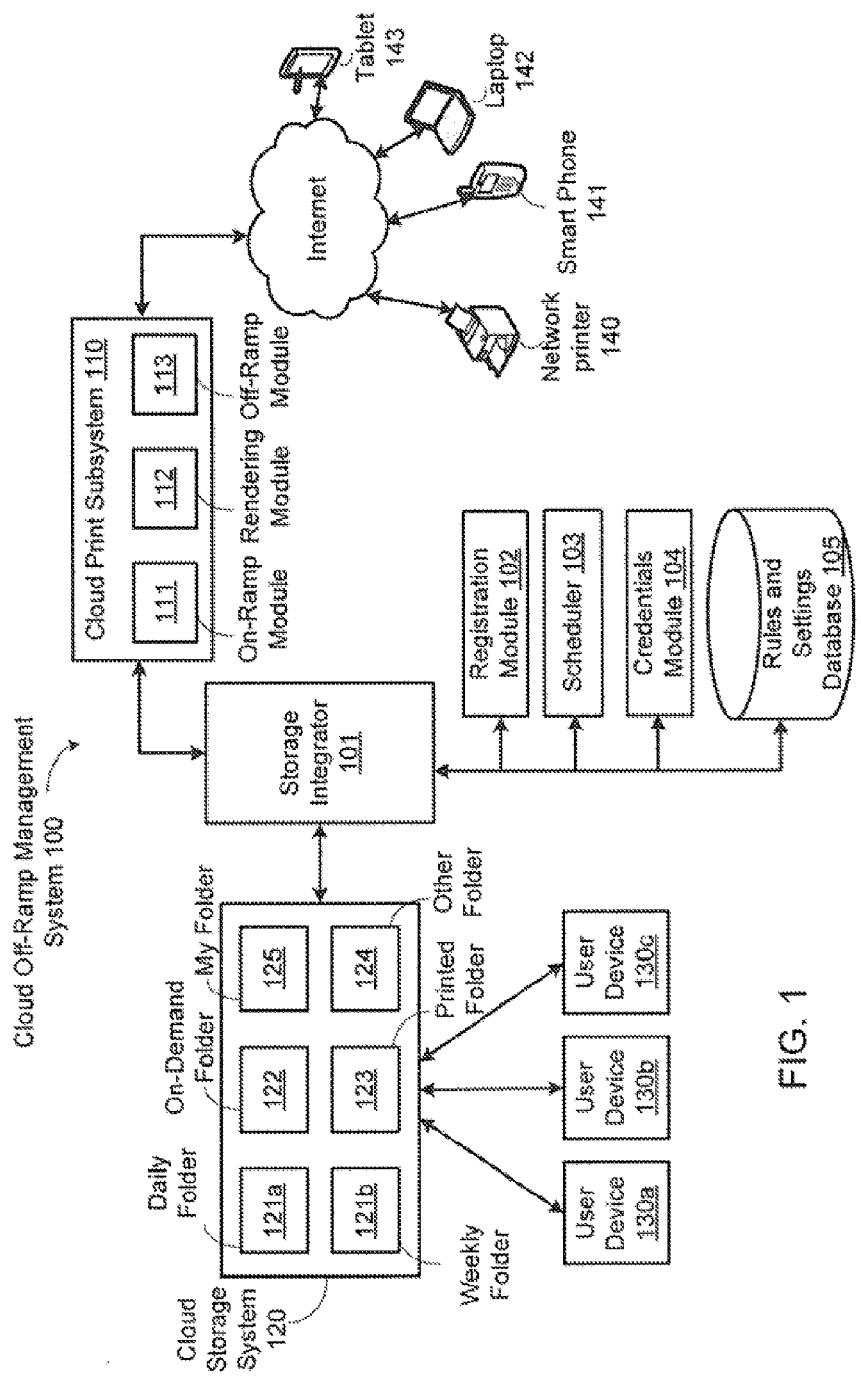
FIGS. 1 and 2 illustrate a cloud off-ramp management system.

FIG. 1 illustrates an example of a cloud off-ramp management system 100. Users may use user devices 130a-c, such as personal computers, mobile phones, tablets, digital cameras, etc., to store content in the cloud storage system 120. The cloud off-ramp management system 100 connects to the cloud storage system 120 to retrieve content from folders 121-125, which may be for a user account in the cloud storage system 120, and sends the content to a network printer 140 and/or to another device, such as one or more of the devices 130a-c for example via the Internet. A folder is a data structure to store files including content. The cloud off-ramp management system 100 may run on one or more servers or other computer systems. The cloud storage system 120 may be external to the cloud off-ramp management system 100 and may be maintained by a different service provider on a different computer. The cloud off-ramp management system 100, although not shown, may connect to the cloud storage system 120 via the Internet and/or another network. Content may include any data which may be stored in the cloud storage system 120. The content my include digital photographs, documents, blogs, rss feeds, etc.

The cloud off-ramp management system 100 may include a storage integrator 101, a registration module 102, a scheduler 103, a credentials module 104, a rules and settings database 105 and a print subsystem 110. The storage integrator 101 may create the folders 121-124 in the cloud storage system 120 and may retrieve content from the folders 121-125 and off-ramp the content to a device, such as the network printer 140 for printing or another device according to folder settings and rules. For example, folders 121a-b are periodic off-ramping folders, such as a daily folder 121a and a weekly folder 121b. Content in these folders if off-ramped daily and weekly respectively. Folder 122 may be an on-demand folder, and content in this folder is off-ramped within a short time of being stored in the folder. Folder 123 may be an off-ramped folder and the storage integrator 101 may move off-ramped content, such as print jobs that have completed or content that has been confirmed as being received by a designated device, to this folder so the user can easily identify what content has been printed or otherwise delivered to the designated device. Folder 124 is an "other" folder and may be used to store content that was not successfully printed or delivered to a designated device. For example, if a print job fails, content from the failed print job may be placed in this folder so the user so the user can easily identify what content failed to print. The content in this folder may also be subsequently off-ramped to a printer or another device. An existing folder may be used for printing content instead of or in addition to folders created by the storage integrator 101. Folder 125, for example "My Folder", may be a folder that was preexisting and was not created by the storage integrator 101. However, settings may be stored for the folder 125, and the storage integrator 101 may retrieve content from this folder according to its settings.

To create the folders 121-124 in the cloud storage system 120, the storage integrator 101 may use an application program interface (API) of the cloud storage system 120 to create the folders 121-124. For example, the service provider of the cloud storage system 120 makes available folder management APIs, and these APIs may be used to create folders, delete folders and move content between folders. APIs for folder management may differ among different cloud storage service providers. Scripts may be created for each cloud service storage system according to the APIs for folder management and the scripts may be executed by the storage integrator 101 to create the folders 121-124, move content between the folders and so on. Similarly, scripts may be created and executed by the storage integrator 101 to login to user accounts in cloud storage systems according to credentials provided by users for their accounts and to create and manage the folders and retrieve content.

For the on-demand folder 122, the storage integrator 101 may subscribe to notifications from the cloud storage system 120 that indicate when content is stored in the on-demand folder. For example, the storage integrator 101 registers for folder change notifications and receives messages from the cloud storage system 120 when a folder change occurs. If the cloud storage system 120 is not capable of providing notifications, the storage integrator 101 periodically polls the on-demand folder 122 to check if the on-demand folder 122 includes content. For example, the storage integrator 101 uses a folder management API of the cloud storage system 120 to frequently check the status of the on-demand folder 122.

The registration module 102 receives registration information for a user and the network printer 140 and stores the registration information for example, in the rules and settings database 105. The rules and settings database 105 may store any information used by the cloud off-ramp management system 100. The registration module 102 may receive registration information for the network printer 140 including serial number, device email address, model, etc. Registration information may be received for any device, such as the devices 130a-c, for which content is to be delivered from the cloud off-ramp management system 100. Also, the registration module 102 receives credentials for user account information in the cloud storage system 120. The credentials may include a user ID and password. In addition, settings and rules may be received from the user and stored in the rules and settings database 105. The settings may be for the folders 121-125 and may indicate the printer or printers for printing content from the folder, periodicity for printing from a folder, such as daily, weekly, etc., a time to print the content, such as 6 PM or 3 AM, and other settings. The rules may include print options, such as black & white, color, settings, paper size settings etc. Rules or settings may include conditions, such as if print job fails, retry to another printer, or only print content in a folder if it is of a specific file type, such as .jpg. Another rule or setting may specify to print different types of files to different printers. Rules may apply globally to multiple folders for a user and settings may apply to a particular folder. Another example of a rule is a concatenating rule. For example, content is concatenated until a certain number of pages or until a certain amount of content is retrieved, and then the concatenated content is off-ramped to the designated device or devices.

The registration module 102 may generate screens in a graphic user interface to allow users to enter registration information. The graphic user interface may be provided in a web portal to the cloud off-ramp management system 100. For example, registration for the network printer 140 may be performed automatically, such as when the printer first connects to the Internet, its information is sent to the cloud off-ramp management system 100, and a printer ID is assigned to the network printer 140. The network printer 140 may be any type of printer that can connect to a network through a network interface. A unique ID may be assigned to each device that is registered. The unique ID may be referred to a device ID. The printer ID is an example of the device ID. The device ID may be for any type of device, such as laptop, tablet computer, smartphone, etc.

The scheduler 103 invokes the storage integrator 101 to retrieve content from the folders 121-125 at predetermined times according to the settings for the folders 121-125. For example, the scheduler 103 instructs the storage integrator 101 to retrieve content from the daily folder 121a at certain times of the day and instructs the storage integrator 101 to retrieve content from the weekly folder 121b once a week. The credentials module 104 provides credentials for logging into the user account in the cloud storage system 120. For example, the credentials module 104 provides credentials for a user account to the storage integrator 101 so it can log into the user account and access the folders 121-125 in the user account in the cloud storage system 120.

The cloud print subsystem 110 receives content retrieved by the storage integrator 101 and off-ramps the content to one or more devices which may be identified based on the folder settings. The cloud print subsystem 110 may include an on-ramp module 111 that receives content from the storage integrator 101 and determines a device associated with the content. For example, a printer ID is determined from settings for the folder from which the content was retrieved. A network address associated with the printer ID may be determined. For example, when the network printer 140 is started and connected to the Internet, it sends a hello message including its Internet Protocol (IP address), which may be associated and stored with its printer ID. A print job for the content is sent to the printer's IP address. In another example, an email address is associated with the network printer 140 and to off-ramp the content, the content is emailed to the network printer 140.

The on-ramp module 111 sends the content retrieved by the storage integrator 101 to the rendering module 112. The rendering module 112 renders the content to a format utilized by the device to receive the off-ramped content. For example, the rendering module 112 renders content for the network printer 140 by converting the content to printer control language (PCL), which is a standard format used by many printers. Postscript is another format that may be used. The rendered content is provided to the off-ramp module 113, which creates a print job including the rendered content to be printed. The print job, in addition to including the content, may include print settings for printing the content, such as color settings, paper size settings, etc. These settings may be determined from the folder settings or rules which may be provided by the user and stored in the database 105. The off-ramp module 113 sends the print job to the printer identified for the folder. For example, the print job is sent to the network printer 140 in packets addressed to the IP address of the network printer 140. The network printer 140 prints the content.

The network printer 140 may send an acknowledgement to the off-ramp module 113 indicating whether the print job completed or failed. The on-ramp module 111 sends the information indicating whether the print job completed or failed to the storage integrator 101. The storage integrator 101 moves the content to the off-ramped folder 123 if the print job completed or to the other folder 124 if the print job failed. Content that failed to print may be re-sent to the network printer 140 to try to print the content again.

The rendering module 112 may render content for a device according to rules and/or settings for device. For example, the rendering module 112 may render content for displaying on a smartphone. The rendering module 112 may identify rending rules from the database 105 for the device, for example, according to a unique ID of the device. The rendering module 112 may format the content for displaying on the device. In one example, the size of the content is adjusted to fit the display. Another rule may be a concatenating rule. For example, the rendering module 112 concatenates content until a certain number of pages, and then the concatenated content is off-ramped to the designated device. For example, the daily folder 121a includes blogs and rss feeds. The rendering rule may be to create 5 pages of content from content from the daily folder and off-ramp the content to the device when the rendered content reaches 5 pages. The device may acknowledge receipt and to the off-ramp module 113 and the storage integrator 101 may move the content from the daily folder 121a to the off-ramped folder 123.

The user devices 130a-c may be able to upload content automatically to the user account in the cloud storage system 120. For example a mobile phone or a digital camera with a network connection may be able to automatically upload content to the on-demand folder 122 or another folder. Then, the content is automatically printed by the cloud off-ramp management system 100 to a printer or multiple printers that may be specified by the user.

Figure 2:
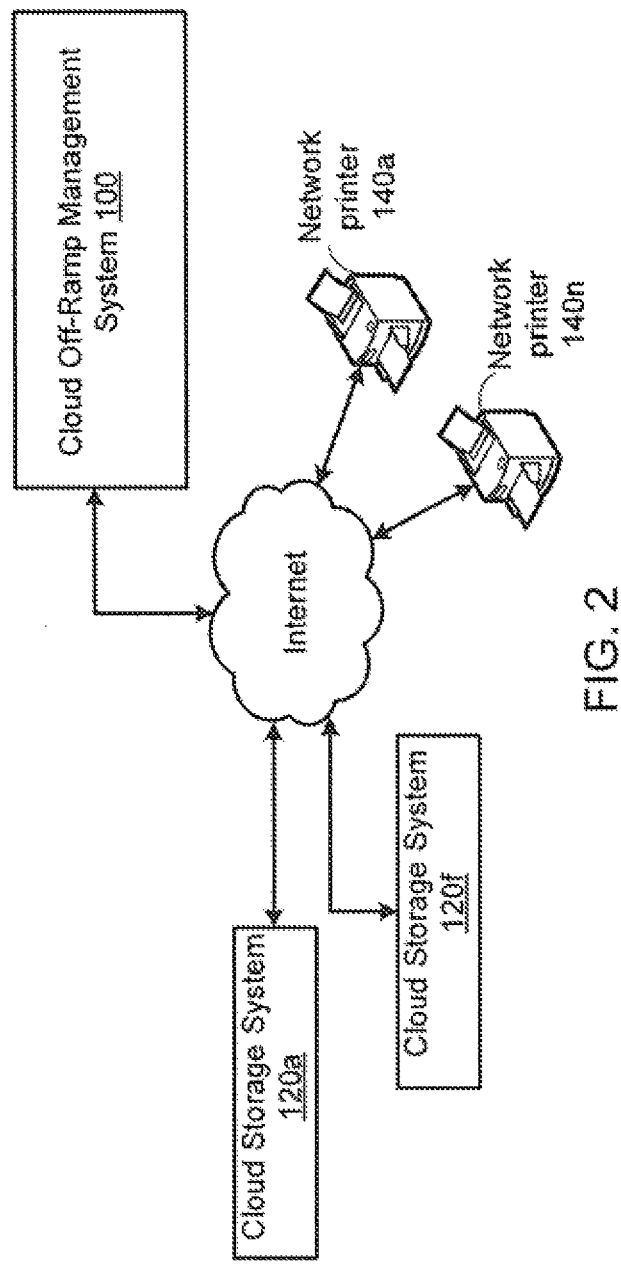

The folders 121-125 shown in the cloud storage system 120 may be for a single user account. The cloud off-ramp management system 100 may configure folders for multiple different accounts for multiple different users in multiple different cloud storage systems. FIG. 2 shows an example whereby the cloud off-ramp management system 100 can connect to different cloud storage systems 120a-f via the Internet and/or another network to retrieve and print content such as described with respect to FIG. 1. The credentials for user accounts in the cloud storage systems 120a-f may be received from a user and stored in the database 105 and used by the storage integrator 101 to log into the user accounts in the cloud storage systems 120a-f to retrieve content for printing.

The cloud off-ramp management system 100 may connect to multiple different network printers 140a-n to print content retrieved from one or more of the cloud storage systems 120a-f. Although not shown, the cloud off-ramp management system 100 may connect to devices other than the network printers to receive content retrieved from one or more of the cloud storage systems 120a4. A user can specify settings for a folder, which may be created by the storage integrator 101 in a cloud storage system as described above, that indicates multiple printers for printing content from the folder. The storage integrator 101 for example uses the folder settings to identify the printer IDs of the printer, which are then used by the print subsystem 110 to send print jobs with the content to the multiple printers.

Also, users having accounts on the same cloud file storage system may share a folder. For example, the same weekly folder may be available through all the user accounts. The storage integrator 101 may determine from settings for the folder that it is shared and sends the content from the folder once a week to the print subsystem 110 to print the content on all the printers associated with the folder. The printers may be for different users sharing the weekly folder.

Figure 3:
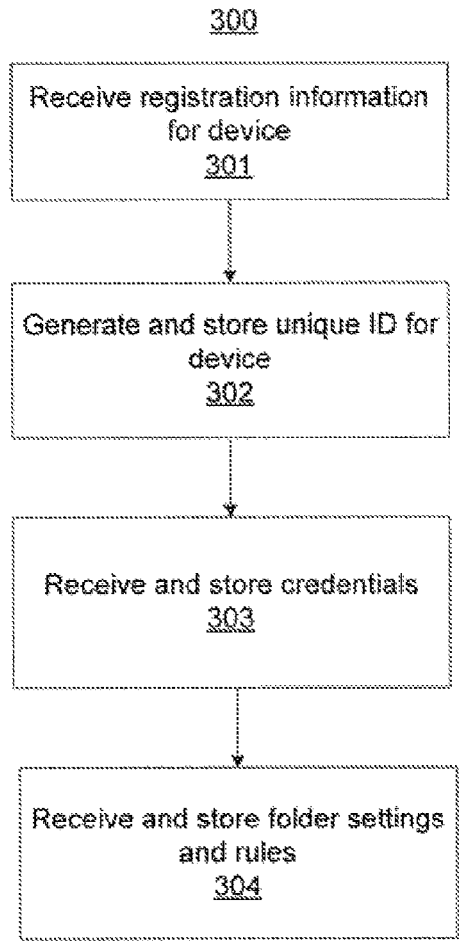
FIGS. 3-6 illustrate methods.

FIG. 3 illustrates a registration method 300 according to an example. The method 300 and other methods described below are described by way of example as performed in the cloud off-ramp management system 100 shown in FIG. 1. The methods may be performed in other systems.

At 301, the cloud off-ramp management system 100 receives registration information for a device, such as the network printer 140 or one of the devices 130a-b generates and stores a unique ID at 302 for the device. For example, the network printer 140 is turned on and connects to the Internet. If the network printer 140 is not previously registered, the network printer 140 sends its information, e.g., serial number, model, etc., to the cloud off-ramp management system 100. The registration module 102 may assign and store a unique ID for the network printer 140 and send the ID to the user of the network printer 140.

At 303, the cloud off-ramp management system 100 receives and stores credentials for a user account for the user in the cloud storage system 120. The credentials may include login ID and password for the user account. The credentials module 104 may retrieve the stored credentials for logging into the user account in the cloud storage system 120. At 304, the cloud off-ramp management system 100 receives and stores settings for folders, such as the folders 121-125, and rules for printing content from the folders 121-125. In addition, settings and rules may be received from the user and stored in the rules and settings database 105. The settings may identify one or more devices to off-ramp content from the folder, periodicity for off-ramping content from the folder, etc. Rules may include device settings or conditional rules. The settings and rules may be specified by a user and stored in the rules and settings database 105.

Figure 4:
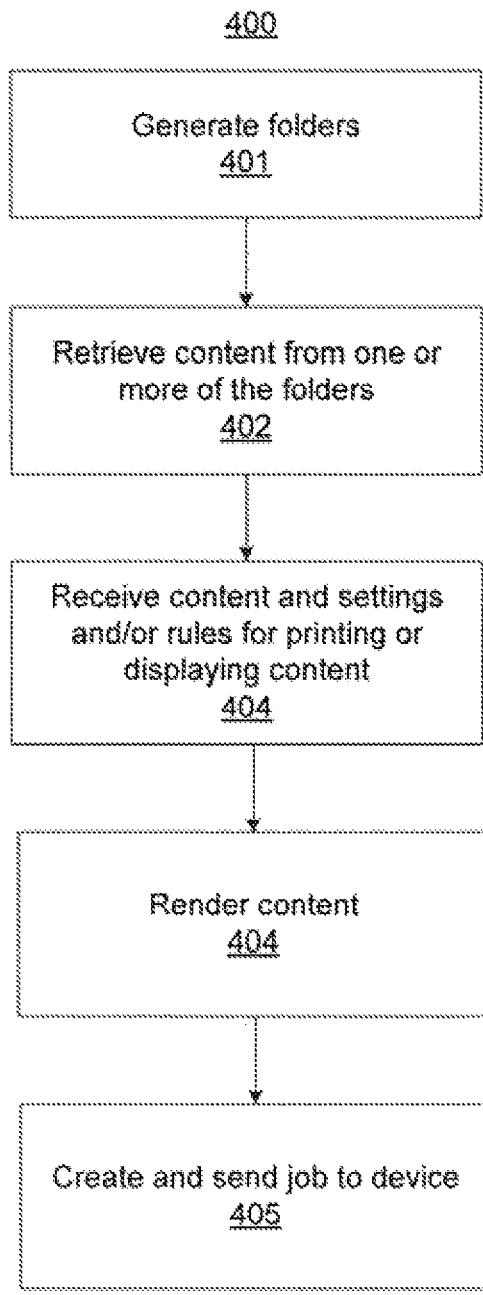

FIG. 4 illustrates a method 400 for off-ramping content according to an example. The method 400 may be performed after the method 300. At 401, the storage integrator 101 generates folders on the cloud storage system 120. Each folder may include settings associated with off-ramping content in the folder. The settings may include settings received and stored at 304. For example, the folders 121-124 are created on a user account in the cloud storage system 120. An existing folder in the user account, such as the folder 125, may be associated with settings for off-ramping content.

At 402, the storage integrator 101 retrieves content from one or more of the folders 121-125 according to the settings for each folder and/or rules for the user account or devices which may be stored in the rules and settings database 105. The scheduler 103 may invoke the storage integrator 101 to retrieve content at certain times as specified by the settings. The settings may also include device IDs, such as a printer ID for a network printer, e.g., network printer 140, to print content from the folder.

At 403, the cloud print subsystem 110 receives the content and settings and/or rules for printing the content, and at 404, renders the content to a format utilized by the network printer 140. For example, the on-ramp module 111 receives the retrieved content and the device ID from the storage integrator 101, and invokes the rendering module 112 to render the content to a format utilized by the device. At 405, the cloud print subsystem 110 off-ramps the content to the device. For example, the cloud print subsystem 110 creates and sends a print job to the network printer 140 for example over the Internet, wherein the print job includes the rendered content, and the network printer 140 prints the content.

Figure 5:
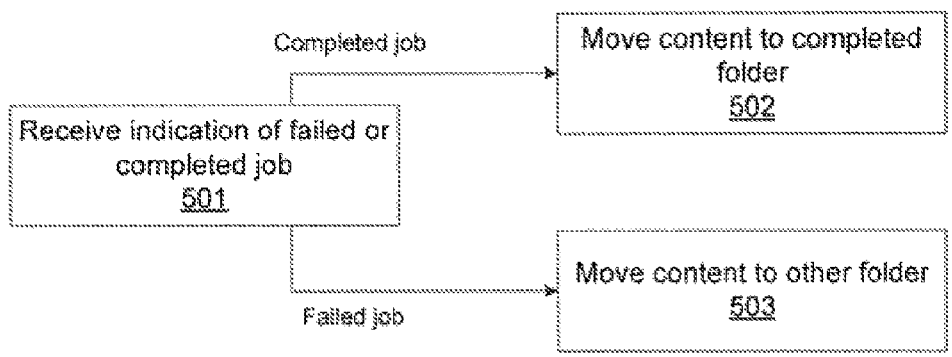

FIG. 5 illustrates a method 500 for checking off-ramped content according to an example. For example, after the content is off-ramped, such as described in the method 400, the cloud print subsystem 110 may receive an indication, at 501, from a device to receive the off-ramped content if the off-ramping was successful or failed. A failure may also be determined if the off-ramp module 113 does not receive an acknowledgement from the device within a timeout period. In another example, the network printer 140 may indicate if a print job was completed or failed. If the off-ramping was successful, at 502, the storage integrator 101 moves the off-ramped content to the off-ramped folder 123. For example, the storage integrator 101 receives an indication from the cloud print subsystem 110 that a print job completed, and moves files for the printed content from one of the folders to the off-ramped folder 123. If the off-ramping failed, at 503, the storage integrator 101 moves the content for the failed off-ramping to the other folder 124. A user can easily identify what content was successfully off-ramped or failed by viewing the files in the off-ramped folder 123 and the other folder 124.

Some or all of the method, operations, functions and components and modules of the cloud print managements system 100 described above may be provided as machine readable instructions executable by at least one processor and stored on a non-transitory computer readable storage medium. For example, they may exist as program(s) comprised of program instructions in source code, object code, executable code or other formats.

Figure 6:
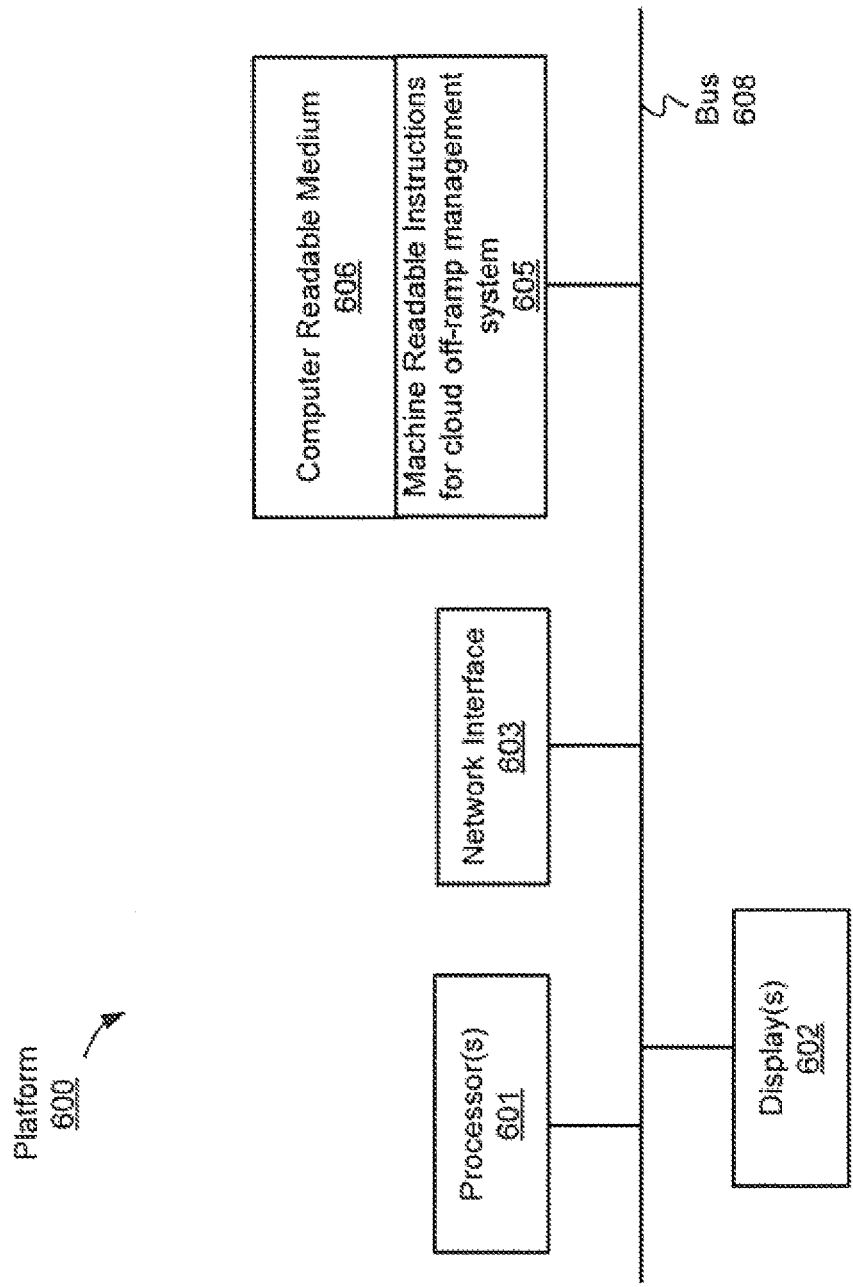

Referring to FIG. 6, there is shown a computer platform 600 that may be used for the cloud print managements system 100. It is understood that the illustration of the platform 600 is a generalized illustration and that the platform 600 may include additional components and that some of the components described may be removed and/or modified without departing from a scope of the platform 600.

The platform 600 includes processor(s) 601, such as a central processing unit, ASIC or other type of processing circuit; a display 602 and/or other input/output devices, a network interface 603, such as a network interface to a Local Area Network (LAN), a wireless 802.11x LAN, a 3G or 6G mobile WAN or a WiMax WAN; and a computer-readable medium 606. Each of these components may be operatively coupled to a bus 608. A non-transitory computer readable medium (CRM), such as CRM 606 may be any suitable medium which stores instructions for execution by the processor(s) 601 for execution. For example, the CRM 606 may be non-volatile media, such as a magnetic disk or solid-state non-volatile memory or volatile media. The CRM 606 may include machine instructions 605 for the cloud off-ramp management system 100.

While embodiments have been described with reference to the disclosure above, those skilled in the art are able to make various modifications to the described embodiments without departing from the scope of the embodiments as described in the following claims, and their equivalents.

What is claimed is:

1. A cloud off-ramp management system comprising:
   a storage integrator to
      generate a plurality of folders on a cloud storage system, each folder including settings associated with off-ramping content in the folder,
      retrieve content from the plurality of folders according to the settings for each folder, and
      determine a device ID associated with the content, wherein the device ID identifies a network device to print or display the content;
   an on-ramp module to receive the retrieved content and the device ID from the storage integrator, and invoke a rendering module to render the content to a format utilized by the device; and
   an off-ramp module to send the rendered content to the device over the Internet.

2. The cloud off-ramp management system of claim 1, comprising:
   a registration module to receive registration information for a user, wherein the registration information includes user account information for the cloud storage system, and
   the storage integrator uses the user account information to access the cloud storage system to generate the plurality of folders and to retrieve the content from the plurality of folders.

3. The cloud off-ramp management system of claim 2, wherein the registration information includes an indication of the network printer to print content stored in the cloud storage system, and the printer ID is assigned to the network printer indicated in the registration information, and an Internet Protocol address or email address is determined for the network printer and stored with the printer ID, and the off-ramp module is to send the print Job to the Internet Protocol address or the email address of the network printer.

4. The cloud off-ramp management system of claim 1, comprising:
   a scheduler, wherein the plurality of folders include a periodic off-ramping folder and the settings for the periodic off-ramping folder include a periodicity for off-ramping content in the folder and an ID for a device to receive the off-ramped content,
   wherein the scheduler invokes the storage integrator to retrieve the content from the periodic off-ramping folder according to the periodicity, and the content is off-ramped to the device according to the periodicity.

5. The cloud off-ramp management system of claim 1, wherein the plurality of folders include an on-demand folder, wherein the storage integrator is to periodically poll the cloud storage system or receive notifications from the cloud storage system, and retrieve the content from the on-demand folder according to the polling or the notifications and send the content from the on-demand folder to the on-ramp module to off-ramp the content from the on-demand folder.

6. The cloud off-ramp management system of claim 1, wherein the plurality of folders include an off-ramped folder and another folder, and the storage integrator is to receive an indication of successful off-ramping content or failure of off-ramping content, and
   if the indication is for a successful off-ramping of the content, the storage integrator is to move the content from one of the plurality of folders to the off-ramped folder, and
   if the indication is for a failure, the storage integrator is to move the content from one of the plurality of folders to the another folder.

7. The cloud off-ramp management system of claim 1, comprising:
   a rules database to store rules for off-ramping content for the plurality of folders and for devices to receive off-ramped content, wherein the content for a folder of the plurality of folders is rendered or off-ramped according to a stored rule for the folder or a device to receive the off-ramped content.

8. The cloud off-ramp management system of claim 7, wherein the stored rule comprises a concatenating rule, and the content from the folder is rendered and off-ramped to the device if the amount of the rendered content or a number of pages of the rendered content is an amount or number of pages specified in the concatenating rule.

9. The cloud off-ramp management system of claim 1, wherein the storage integrator is to
   identify a plurality of cloud storage systems for a plurality of users,
   generate the plurality of folders on the plurality of cloud storage systems, and
   retrieve content from the plurality of folders on the plurality of cloud storage systems and provide the content to the on-ramp module for off-ramping the content.

10. The cloud off-ramp management system of claim 8, wherein content from the plurality of cloud storage systems is linked to a network printer or another device, and the off-ramp module is to create and send print jobs for the content to the network printer or to send rendered content from the plurality of cloud storage systems to the another device.

11. The cloud off-ramp management system of claim 1, wherein the settings include a plurality of printers or other devices associated with a folder of the plurality of folders, and the storage integrator is to send content for the folder to the on-ramp module for printing on the plurality of printers or displaying on the other devices.

12. The cloud off-ramp management system of claim 1, wherein the storage integrator is to retrieve content from an existing folder created by a user on the cloud system according to a rule or setting for the existing folder.

13. The cloud off-ramp management system of claim 1, wherein a photograph created by a device is automatically uploaded to one of the plurality of folders after being created and the storage integrator is to send the photograph to the on-ramp module for printing or displaying on another device according to the settings for the folder.

14. A method for cloud print management comprising:
generating, by a processor, a plurality of folders on a cloud storage system, each folder including settings associated with off-ramping content in the folder;
retrieving content from the plurality of folders according to the settings for each folder;
determining an ID associated with the content, wherein the ID identifies a device to receive the off-ramped content;
rendering the content to a format utilized by the device;
determining a network address or an email address for the device based on the ID; and
sending the rendered content over the Internet to the device.

15. The method of claim 14, further comprising:
receiving registration information for a user, wherein the registration information includes user account information for the cloud storage system, and using the user account information to access the cloud storage system for generating the plurality of folders and retrieving the content from the plurality of folders.

16. The method of claim 15, wherein the registration information includes an indication of the device to receive the off-ramped content.

17. The method of claim 14, further comprising:
receiving an indication of successful off-ramping content or failure of off-ramping content, wherein the plurality of folders include an off-ramped folder and at least one other folder.

18. The method of claim 14, further comprising:
storing a plurality of rules for off-ramping content for the plurality of folders and for devices to receive off-ramped content.

19. The method of claim 14, further comprising:
identifying a plurality of cloud storage systems for a plurality of users;
generating the plurality of folders on the plurality of cloud storage systems;
retrieving content from the plurality of folders on the plurality of cloud storage systems; and
off-ramping the content.

20. A non-transitory computer readable medium including machine readable instructions that when executed by at least one processor is to:
receive account login information for a user account on a cloud storage system;
access a folder on the cloud storage system using the account login information based on stored settings for the folder;
retrieve content in the folder;
determine, from the settings, an ID associated with a device to receive the content;
render the content to a format utilized by the device identified by the ID; and
send the rendered content over the Internet to the device.

* * * * *

UNITED STATES PATENT AND TRADEMARK OFFICE
CERTIFICATE OF CORRECTION

PATENT NO. : 9,667,724 B2  
APPLICATION NO. : 14/764905  
DATED : May 30, 2017  
INVENTOR(S) : Kumaravel Ganesan et al.

Page 1 of 1

It is certified that error appears in the above-identified patent and that said Letters Patent is hereby corrected as shown below:

In Column 8, Line 8, in Claim 3, delete "Job" and insert -- job --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*